(12) United States Patent
Braun et al.

(10) Patent No.: US 10,584,650 B2
(45) Date of Patent: Mar. 10, 2020

(54) METHOD FOR DETERMINING THE COMPOSITION OF THE FUEL USED AND OPERATING AN INTERNAL COMBUSTION ENGINE

(71) Applicant: Continental Automotive GmbH, Hannover (DE)

(72) Inventors: Tobias Braun, Undorf (DE); Gerhard Haft, Lappersdorf (DE); Rainer List, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/064,748

(22) PCT Filed: Nov. 24, 2016

(86) PCT No.: PCT/EP2016/078742
§ 371 (c)(1),
(2) Date: Jun. 21, 2018

(87) PCT Pub. No.: WO2017/108324
PCT Pub. Date: Jun. 29, 2017

(65) Prior Publication Data
US 2018/0372009 A1  Dec. 27, 2018

(30) Foreign Application Priority Data
Dec. 22, 2015 (DE) .......... 10 2015 226 446

(51) Int. Cl.
*F02D 19/08* (2006.01)
*F02D 41/00* (2006.01)
(Continued)

(52) U.S. Cl.
CPC .......... *F02D 19/088* (2013.01); *F02D 13/02* (2013.01); *F02D 19/084* (2013.01);
(Continued)

(58) Field of Classification Search
CPC ........ F02D 13/02; F02D 19/08; F02D 19/084; F02D 19/088; F02D 41/00;
(Continued)

(56) References Cited

U.S. PATENT DOCUMENTS

| | | | |
|---|---|---|---|
| 5,697,346 A | 12/1997 | Beck | ............................. 123/494 |
| 7,832,259 B2 * | 11/2010 | Wang | .................... F02D 35/024 |
| | | | 73/114.25 |

(Continued)

FOREIGN PATENT DOCUMENTS

| | | | | |
|---|---|---|---|---|
| DE | 102007053248 A1 | 5/2009 | ............. | F02D 41/00 |
| DE | 102009017207 B4 | 12/2009 | ............. | F02D 41/00 |

(Continued)

OTHER PUBLICATIONS

German Office Action, Application No. 102015226446.7, 4 pages, dated Jul. 25, 2016.
(Continued)

*Primary Examiner* — John Kwon
*Assistant Examiner* — Johnny H Hoang
(74) *Attorney, Agent, or Firm* — Slayden Grubert Beard PLLC (57) ABSTRACT

An example method for operating an internal combustion engine may include: measuring pressure oscillations for a cylinder in the inlet tract at a defined operating point during normal operation; generating a corresponding oscillation signal; determining a crankshaft phase angle corresponding to the oscillation signal; and from the pressure oscillation signal, using discrete Fourier transformation to calculate the actual phase position of a selected signal frequency; determining a further comparison phase position in the same way from the selected signal frequency in the absence of fuel injection; calculating an actual phase position difference; on the basis of the difference, taking into consideration refer-
(Continued)

ence phase position differences of the same signal frequency for different fuel compositions, to identify a fuel composition of the presently used fuel; and adapting operating parameters of the engine based on the identified composition.

15 Claims, 3 Drawing Sheets

(51) Int. Cl.
*F02D 13/02* (2006.01)
*F02D 41/28* (2006.01)
*F02D 41/24* (2006.01)

(52) U.S. Cl.
CPC ......... *F02D 41/0025* (2013.01); *F02D 41/28* (2013.01); *F02D 41/2422* (2013.01); *F02D 2041/288* (2013.01); *F02D 2200/021* (2013.01); *F02D 2200/0406* (2013.01); *F02D 2200/0414* (2013.01); *F02D 2200/0612* (2013.01); *F02D 2200/101* (2013.01); *Y02T 10/18* (2013.01)

(58) Field of Classification Search
CPC ............ F02D 41/0002; F02D 41/0025; F02D 41/00928; F02D 41/288; F02D 41/2432; F02D 41/2464; F02D 41/28; F02D 41/3005; F02D 2200/0406; F02D 2200/0612; F02D 2200/021; F02D 2200/101; F02D 2041/001; F02D 2041/288; Y02T 10/42

USPC ................... 123/27 GE, 525–527, 575–577; 701/101–105

See application file for complete search history.

(56) References Cited

U.S. PATENT DOCUMENTS

| | | | |
|---|---|---|---|
| 8,000,880 B2 | 8/2011 | Shibata et al. ................ 701/104 |
| 2005/0205021 A1* | 9/2005 | Shute .................. F02D 19/0628 |
| | | | 123/27 GE |
| 2009/0178474 A1 | 7/2009 | Bailey ......................... 73/114.38 |
| 2010/0010727 A1* | 1/2010 | Cippitani ............ F02D 41/0027 |
| | | | 701/103 |
| 2011/0061622 A1* | 3/2011 | Lund ...................... F02B 13/00 |
| | | | 123/1 A |
| 2016/0047325 A1* | 2/2016 | Ahlinder .............. F02D 19/085 |
| | | | 701/104 |
| 2016/0305356 A1* | 10/2016 | Iwata .................... F02D 41/403 |

FOREIGN PATENT DOCUMENTS

| | | | |
|---|---|---|---|
| DE | 102009031159 B3 | 4/2011 | ............. G01N 27/06 |
| DE | 102011077404 B4 | 12/2012 | ............. F02D 41/00 |
| EP | 2581588 A1 | 4/2013 | ............. F02D 41/00 |
| EP | 2725216 A1 | 4/2014 | ............. F02D 35/02 |
| WO | 2014/154227 A1 | 10/2014 | ............. F02D 19/08 |
| WO | 2017/108324 A1 | 6/2017 | ............. F02D 19/08 |

OTHER PUBLICATIONS

International Search Report and Written Opinion, Application No. PCT/EP2016/078742, 21 pages, dated Mar. 10, 2017.

* cited by examiner

METHOD FOR DETERMINING THE COMPOSITION OF THE FUEL USED AND OPERATING AN INTERNAL COMBUSTION ENGINE

CROSS-REFERENCE TO RELATED APPLICATIONS

This application is a U.S. National Stage Application of International Application No. PCT/EP2016/078742 filed Nov. 24, 2016, which designates the United States of America, and claims priority to DE Patent Application No. 10 2015 226 446.7 filed Dec. 22, 2015, the contents of which are hereby incorporated by reference in their entirety.

TECHNICAL FIELD

The present disclosure relates to internal combustion engines. Various embodiments may include a method for determining the composition of the fuel used in the operation of an internal combustion engine from the intake pipe pressure signal during the operation of the internal combustion engine and adapting the operation of the engine in response.

BACKGROUND

Reciprocating-piston internal combustion engines, which will in this context and hereinafter also be referred to in shortened form merely as internal combustion engines, have one or more cylinders in which one reciprocating piston is arranged. To illustrate the principle of a reciprocating-piston internal combustion engine, reference will be made below to FIG. 1, which illustrates by way of example a cylinder of a prior art internal combustion engine, which is possibly also a multi-cylinder internal combustion engine, together with the most important functional units.

Figure 1:
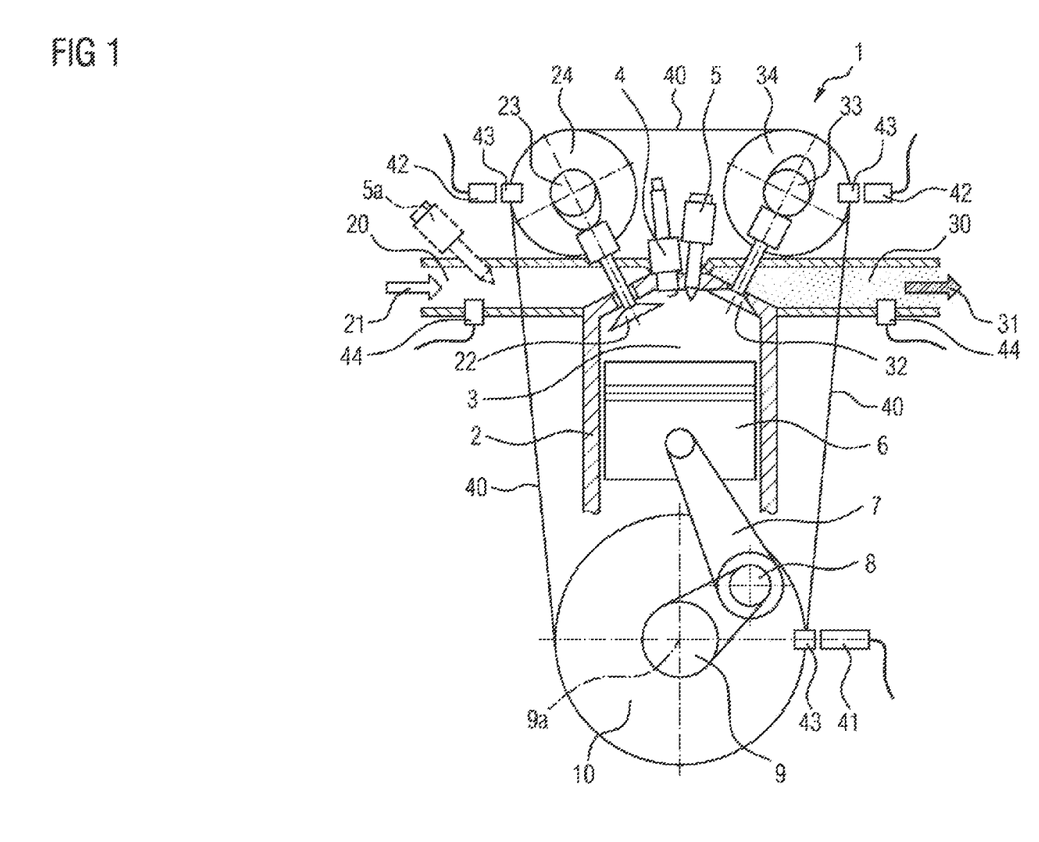
FIG. 1 is a simplified illustration of a prior art reciprocating-piston internal combustion engine, referred to here in shortened form as internal combustion engine, with the most important functional components.

The respective reciprocating piston 6 is arranged in linearly movable fashion in the respective cylinder 2 and, together with the cylinder 2, encloses a combustion chamber 3. The respective reciprocating piston 6 is connected by means of a so-called connecting rod 7 to a respective crankpin 8 of a crankshaft 9, wherein the crankpin 8 is arranged eccentrically with respect to the crankshaft axis of rotation 9a. As a result of the combustion of a fuel-air mixture in the combustion chamber 3, the reciprocating piston 6 is driven linearly "downward".

The translational stroke movement of the reciprocating piston 6 is transmitted by means of the connecting rod 7 and crankpin 8 to the crankshaft 9 and is converted into a rotational movement of the crankshaft 9, which causes the reciprocating piston 6, owing to its inertia, after it passes through a bottom dead center in the cylinder 2, to be moved "upward" again in the opposite direction as far as a top dead center. To permit continuous operation of the internal combustion engine 1, during a so-called working cycle of a cylinder 2, it is necessary firstly for the combustion chamber 3 to be filled with the fuel-air mixture, for the fuel-air mixture to be compressed in the combustion chamber 3 and to then be ignited (by means of an ignition plug in the case of a gasoline internal combustion engine and by ultra-ignition in the case of a diesel internal combustion engine) and burned in order to drive the reciprocating piston 6, and finally for the exhaust gas that remains after the combustion to be discharged from the combustion chamber 3. Continuous repetition of this sequence results in continuous operation of the internal combustion engine 1, with work being output in a manner proportional to the combustion energy.

Depending on the engine concept, a working cycle of the cylinder is divided into two strokes distributed over one crankshaft rotation (360°) (two-stroke engine) or into four strokes distributed over two crankshaft rotations) (720°) (four-stroke engine). To date, the four-stroke engine has become established as a drive for motor vehicles. In an intake stroke, with a downward movement of the reciprocating piston 6, fuel-air mixture 21 (in the case of intake pipe injection by means of injection valve 5a, illustrated as an alternative in FIG. 1 by means of dashed lines) or else only fresh air (in the case of fuel direct injection by means of injection valve 5) is introduced from the intake tract 20 into the combustion chamber 3. During the following compression stroke, with an upward movement of the reciprocating piston 6, the fuel-air mixture or the fresh air is compressed in the combustion chamber 3, and if appropriate fuel is separately injected by means of an injection valve 5. During the following working stroke, the fuel-air mixture, for example in the case of the gasoline internal combustion engine, is ignited by means of an ignition plug 4, burns and expands, outputting work, with a downward movement of the reciprocating piston 6. Finally, in an exhaust stroke, with another upward movement of the reciprocating piston 6, the remaining exhaust gas 31 is discharged out of the combustion chamber 3 into the exhaust-gas tract 30.

The delimitation of the combustion chamber 3 with respect to the intake tract 20 or exhaust-gas tract 30 of the internal combustion engine 1 is realized generally, and in particular in the example taken as a basis here, by means of inlet valves 22 and outlet valves 32. In the current prior art, said valves are actuated by means of at least one camshaft. The example shown has an inlet camshaft 23 for actuating the inlet valves 22 and has an outlet camshaft 33 for actuating the outlet valves 32. There are normally yet further mechanical components (not illustrated here) for force transmission provided between the valves and the respective camshaft, which components may also include a valve play compensation means (e.g. bucket tappet, rocker lever, finger-type rocker, tappet rod, hydraulic tappet etc.).

The inlet camshaft 23 and the outlet camshaft 33 are driven by means of the internal combustion engine 1 itself. For this purpose, the inlet camshaft 23 and the outlet camshaft 33, in each case by means of suitable inlet camshaft control adapters 24 and outlet camshaft control adapters 34, such as for example toothed gears, sprockets or belt pulleys, and with the aid of a control mechanism 40, which has for example a toothed gear mechanism, a control chain or a toothed control belt, are coupled, in a predefined position with respect to one another and with respect to the crankshaft 9 by means of a corresponding crankshaft control adapter 10, which is correspondingly formed as a toothed gear, sprocket or belt pulley, to the crankshaft 9. By means of this connection, the rotational position of the inlet camshaft 23 and of the outlet camshaft 33 in relation to the rotational position of the crankshaft 9 is, in principle, defined. By way of example, FIG. 1 illustrates the coupling between inlet camshaft 23 and the outlet camshaft 33 and the crankshaft 9 by means of belt pulleys and a toothed control belt.

The rotational angle covered by the crankshaft during one working cycle will hereinafter be referred to as working phase or simply as phase. A rotational angle covered by the crankshaft within one working phase is accordingly referred to as phase angle. The respectively current crankshaft phase angle of the crankshaft 9 can be detected continuously by means of a position encoder 43 connected to the crankshaft 9, or to the crankshaft control adapter 10, and an associated crankshaft position sensor 41. Here, the position encoder 43 may be formed for example as a toothed gear with a multiplicity of teeth arranged so as to be distributed equidistantly over the circumference, wherein the number of individual teeth determines the resolution of the crankshaft phase angle signal. It is likewise additionally possible, if appropriate, for the present phase angles of the inlet camshaft 23 and of the outlet camshaft 33 to be detected continuously by means of corresponding position encoders 43 and associated camshaft position sensors 42.

Since, owing to the predefined mechanical coupling, the respective crankpin 8, and with the latter the reciprocating piston 6, the inlet camshaft 23, and with the latter the respective inlet valve 22, and the outlet camshaft 33, and with the latter the respective outlet valve 32, move in a predefined relationship with respect to one another and in a manner dependent on the crankshaft rotation, said functional components run through the respective working phase synchronously with respect to the crankshaft. The respective rotational positions and stroke positions of reciprocating piston 6, inlet valves 22 and outlet valves 32 can thus, taking into consideration the respective transmission ratios, be set in relation to the crankshaft phase angle of the crankshaft 9 predefined by the crankshaft position sensor 41. In an ideal internal combustion engine, it is thus possible for every particular crankshaft phase angle to be assigned a particular crankpin angle, a particular piston stroke, a particular inlet camshaft angle and thus a particular inlet valve stroke and also a particular outlet camshaft angle and thus a particular outlet camshaft stroke. That is to say, all of the stated components are, or move, in phase with the rotating crankshaft 9.

In modern internal combustion engines 1, there may be additional positioning elements within the mechanical coupling path between crankshaft 9 and inlet camshaft 23 and the outlet camshaft 33, for example integrated into the inlet camshaft adapter 24 and the outlet camshaft adapter 34, which positioning elements effect a desired controllable phase shift between the crankshaft 9 and inlet camshaft 23 and the outlet camshaft 33. These are known as so-called phase adjusters in so-called variable valve drives.

For optimum operation of the internal combustion engine (with regard to emissions, consumption, power, running smoothness etc.), the fresh-gas charge drawn in during the intake stroke should be known as accurately as possible, and the metered fuel quantity should be coordinated therewith as exactly as possible, in order for example to be able to ensure operation with lambda $(\lambda)=1$, that is to say with the minimum quantity of oxygen required for the complete combustion of the fuel to be metered.

The drawn-in fresh-gas charge is dependent on various factors, such as for example the structural details of the internal combustion engine, the present operating point, and the present settings of different positioning devices, for example a throttle flap. The prior art for determining the fresh-gas charge is to measure a so-called reference internal combustion engine in all occurring operating states (engine speed, load, actuation of all actuators, different valve strokes, actuation of flaps, actuation of the phase adjusters for inlet and outlet valve, exhaust-gas turbocharger, compressor etc.), and to store said measurement values (or derivatives thereof or model-based approaches which replicate the behavior) in corresponding characteristic maps in the engine control unit of a corresponding series internal combustion engine. All structurally identical, series-production internal combustion engines of the same type series are operated with this reference dataset that is generated. As a first approximation, the fresh-gas charge can thus be assumed as being known.

The associated fuel quantity to be metered, in particular to be injected, is then calculated in accordance with the predefined air/fuel ratio (A/F ratio) of the respective fuel, which is dependent on the fuel type and the fuel quality or the fuel composition.

Differences thus arise depending on the fuel used. Accordingly, for example in the case of mixed fuels composed of premium gasoline and ethanol, the following air/fuel ratios are present:
100 Vol % premium gasoline 0 Vol % ethanol (E0)=>14.5
75 Vol % premium gasoline 25 Vol % ethanol (E25)=>13.1
50 Vol % premium gasoline 50 Vol % ethanol (E50)=>11.8
25 Vol % premium gasoline 75 Vol % ethanol (E75)=>10.4
0 Vol % premium gasoline 100 Vol % ethanol (E100)=>9.0

The ethanol fraction is stated in the designation of the mixed fuel in each case in percent by volume, that is to say the mixed fuel E25 is accordingly composed of 75 Vol % premium gasoline and 25 Vol % ethanol. For optimum operation of the internal combustion engine with regard to consumption, running smoothness and emissions, it is thus also necessary for the composition of the fuel used in the respectively present operating mode to be known as accurately as possible, because otherwise erroneously metered fuel quantities may arise. Furthermore, different fuels or fuel compositions may have different characteristics, such as for example different knock resistances. For optimization of the operation, this may necessitate further adaptations, for example of the injection time or of the ignition time.

Since fuels are possibly not always available in the same quality or composition, differences may arise here from tank filling to tank filling, which differences adversely affect the operation of the internal combustion engine. For this reason, various methods and devices are already known from the prior art which have the aim of determining the fuel composition or the fuel quality.

For example, document DE 10 2009 031 159 B3 discloses a method and a device for determining a fuel quality, in particular a mixed composition of a fuel. The method is based on the determination of an electrical parameter of the fuel by means of an electric motor which has a stator and a rotor, wherein, in a gap between rotor and stator, an electrical parameter of the fuel situated therein is determined, which electrical parameter is a measure of the fuel quality.

Also known from document DE 10 2009 017 207 B4, for example, is a method for detecting the fuel quality, in which method a fuel quality value is calculated by means of a fuel quality calculation module on the basis of a torque of the engine and a change in engine speed measured over a first time period.

Furthermore, document DE 10 2011 077 404 B4 also discloses a method for determining the fuel type, which method is based on a highly precise feed of a particular differential fuel delivery quantity into a high-pressure fuel accumulator. From the corresponding pressure increase curve, a measurement value curve is determined, which is compared with comparison value curves, stored in an associated control device, for different fuel qualities. In the case of sufficient correlation of the measurement value curve with a comparison value curve, the associated fuel quality is determined.

The known methods commonly require additional sensors or, owing to environmental influences which are difficult to detect, are complicated to implement and give unsatisfactory results.

SUMMARY

The teachings of the present disclosure may permit, as far as possible without additional sensor arrangement and outlay in terms of apparatus, as exact as possible a determination of the quality or of the composition of the fuel used during presently ongoing operation, in order to be able to make corresponding adaptations to the operating parameters in order to optimize the ongoing operation. For example, some embodiments may include a method for determining the composition of the fuel used for the normal operation of an internal combustion engine, wherein dynamic pressure oscillations, assignable to a cylinder of the internal combustion engine, in the inlet tract of the respective internal combustion engine are measured at a defined operating point during intake-synchronous fuel injection during normal operation, and from these, a corresponding pressure oscillation signal is generated, and wherein, at the same time, a crankshaft phase angle signal is determined, and from the pressure oscillation signal, using discrete Fourier transformation, the actual phase position of a selected signal frequency of the measured pressure oscillations in relation to the crankshaft phase angle signal is determined, characterized in that, in addition to the determined actual phase position of the selected signal frequency in the case of intake-synchronous fuel injection, a further comparison phase position is determined in the same way from the selected signal frequency in the absence of fuel injection or in the case of direct fuel injection into the closed combustion chamber, and in that an actual phase position difference between the actual phase position and comparison phase position is determined, wherein, on the basis of the determined actual phase position difference, taking into consideration reference phase position differences of the same signal frequency for different fuel compositions, the fuel composition of the presently used fuel is determined.

In some embodiments, the reference phase position differences are stored in reference value characteristic maps or are determined by means of a stored model function.

In some embodiments, the reference phase position differences of the selected signal frequency have been determined prior to the normal operation on a reference internal combustion engine as a function of different fuel compositions.

In some embodiments, the model function has been derived prior to the normal operation from the reference phase position differences of the selected signal frequency and the associated fuel compositions, and replicates the relationship between the reference phase position differences of the selected signal frequency and the fuel compositions.

In some embodiments, an additional corrective value, which is specific to the respective internal combustion engine, is taken into consideration in the determination of the fuel composition.

In some embodiments, the corrective value specific to the internal combustion engine is determined and stored on the respective internal combustion engine prior to the normal operation by determination of the actual phase position difference using a reference fuel with known fuel composition by comparison with the reference phase position difference for the known fuel composition.

In some embodiments, additionally, at least one of the further operating parameters: temperature of the intake medium in the intake tract, temperature of a coolant used for cooling the internal combustion engine, and/or engine speed of the internal combustion engine, is taken into consideration in the determination of the fuel composition of the fuel used.

In some embodiments, the determination of the actual phase position difference of the selected signal frequency and the determination of the composition of the presently used fuel is performed with the aid of an electronic processing unit assigned to the internal combustion engine, wherein the reference value characteristic maps or the model function are stored in at least one memory area of the electronic processing unit.

In some embodiments, the individual corrective value is also stored in at least one memory area of the electronic processing unit.

In some embodiments, the prior determination of the reference phase position differences of the selected signal frequency is characterized by the measurement of a reference internal combustion engine at least one defined operating point, in a measurement mode using reference fuels of different, known fuel compositions, wherein, for the determination of the reference phase position differences, the dynamic pressure oscillations, assignable to a cylinder of the reference internal combustion engine, in the inlet tract are measured in the measurement mode, in the case of intake-synchronous fuel injection and in the absence of fuel injection or in the case of direct fuel injection into the closed combustion chamber, and corresponding pressure oscillation signals are generated, wherein, at the same time, a crankshaft phase angle signal is determined, and, from the pressure oscillation signals, by means of discrete Fourier transformation, a reference phase position and a reference comparison phase position of a selected signal frequency of the measured pressure oscillations in relation to the crankshaft phase angle signal for the respective reference fuel are determined, and a respective reference phase position difference between the reference phase position and the reference comparison phase position is determined and stored as a function of the associated fuel compositions in reference value characteristic maps.

In some embodiments, the selected signal frequencies are the intake frequency or a multiple of the intake frequency.

In some embodiments, the dynamic pressure oscillations are measured by means of a series-production-type pressure sensor in the intake pipe.

In some embodiments, the crankshaft position feedback signal is determined by means of a toothed gear and a Hall sensor.

In some embodiments, the electronic processing unit is an engine control unit for controlling the internal combustion engine, and an adaptation of further control variables or control routines for the control of the internal combustion engine is performed by the engine control unit as a function of the determined fuel composition.

BRIEF DESCRIPTION OF THE DRAWINGS

To explain the functioning of an internal combustion engine and the relationships between the fuel composition and phase position of the pressure oscillation signal measured in the intake pipe, and the principles and functioning of the method according to the teachings herein, reference is made to the figures. In the figures.

DETAILED DESCRIPTION

The teachings herein may be embodied in a method, in which dynamic pressure oscillations, assignable to a cylinder of the internal combustion engine, in the inlet tract of the respective internal combustion engine are measured at a defined operating point during intake-synchronous fuel injection during normal operation, and from these, a corresponding pressure oscillation signal is generated. At the same time, a crankshaft phase angle signal is determined. From the pressure oscillation signal, using discrete Fourier transformation, the actual phase position of a selected signal frequency of the measured pressure oscillations in relation to the crankshaft phase angle signal is determined. The method is characterized in particular in that, in addition to the determined actual phase position of the selected signal frequency in the case of intake-synchronous fuel injection, a further comparison phase position of the selected signal frequency is determined in the same way. This is determined in the absence of fuel injection or in the case of direct fuel injection into the closed combustion chamber. Subsequently, an actual phase position difference between the actual phase position and comparison phase position is determined. Then, on the basis of the determined actual phase position difference, taking into consideration reference phase position differences of the same signal frequency for different fuel compositions, the fuel composition of the presently used fuel is determined. Assuming an intake-synchronous fuel injection, there is a unique relationship between the composition of the fuel used for operation and the phase position of the dynamic pressure oscillations in the inlet tract of the internal combustion engine. This relationship is observed in particular in gasoline engines, for example in conjunction with the different fractions of premium fuel and ethanol.

Physical causes for this relationship are the different enthalpies of evaporation of the fuel compositions used. For example, an E0 fuel has an enthalpy of evaporation of approximately 350 kJ/kg, whereas an E100 fuel has an enthalpy of evaporation of approximately 920 kJ/kg. In the case of intake-synchronous injection, these different enthalpies of evaporation lead to different cooling of the fresh-gas charge, whereby, in turn, the density and thus the sound propagation speed in the fresh-gas charge change, and thus ultimately the propagation of the pressure waves in the intake tract, are measurably changed.

In some embodiments, the dynamic pressure oscillations, assignable to a cylinder of the internal combustion engine, in the inlet tract of the respective internal combustion engine are measured at a defined operating point firstly during intake-synchronous fuel injection during normal operation, and from these, a corresponding pressure oscillation signal is generated. At the same time, a crankshaft phase angle signal of the internal combustion engine is determined, as a reference signal, as it were.

One possible operating point would for example be idle operation at a predefined rotational speed. Here, intake-synchronous injection is to be understood to mean injection in a time period during which, with the inlet valve open, fresh gas is fed into the combustion chamber. This may be realized by injection of the fuel into the intake pipe or directly into the combustion chamber of the respective cylinder with the inlet valve simultaneously open. Normal operation characterizes the intended operation of the internal combustion engine, for example in a motor vehicle, wherein the internal combustion engine is an example of a series of internal combustion engines of identical design.

A further customary term for an internal combustion engine of said type, which will also be correspondingly used below, is series internal combustion engine. For the analysis of the pressure oscillation signal recorded in the intake tract of the internal combustion engine in relation to the phase position, said pressure oscillation signal can be subjected to a discrete Fourier transformation (DFT). For this purpose, an algorithm known as a fast Fourier transformation (FFT) may be used for the efficient calculation of the DFT. By means of DFT, the pressure oscillation signal is now broken down into individual signal frequencies which can thereafter be separately analyzed in simplified fashion with regard to their amplitude and the phase position. In the present case, it has been found that, in particular, the phase position of selected signal frequencies of the pressure oscillation signal are dependent on the fuel composition used.

In some embodiments, only those signal frequencies which correspond to the intake frequency are used as base frequency or 1st harmonic, of the internal combustion engine or to a multiple of the intake frequency, that is to say the 2nd to n-th harmonic, wherein the intake frequency in turn has a unique relationship with the speed of the internal combustion engine. Then, for at least one selected signal frequency, taking into consideration the crankshaft phase angle signal detected in parallel, the phase position of said selected signal frequency is determined in relation to the crankshaft phase angle.

Figure 2:
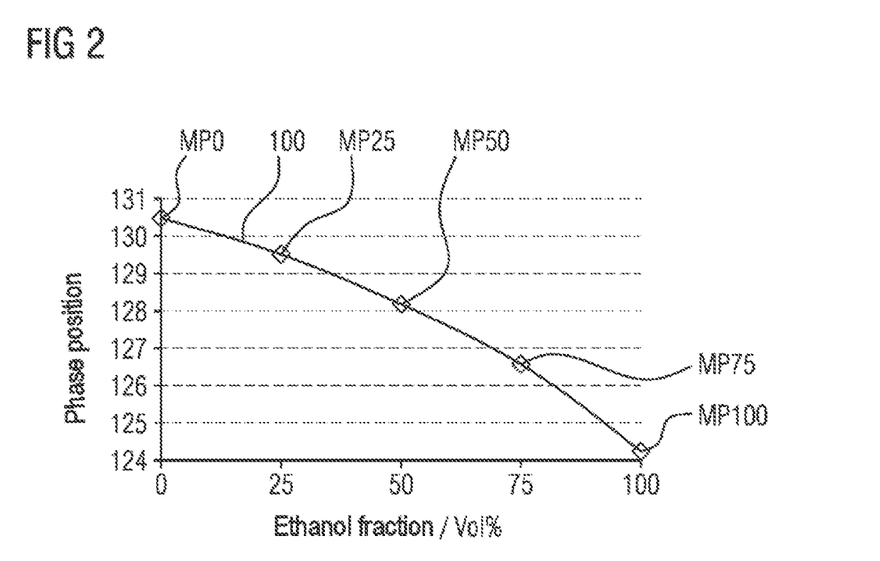
FIG. 2 shows a diagram for illustrating the dependency between the phase position of the intake frequency and the ethanol fraction of the fuel used.

The dependency of the phase position of the selected signal frequencies on the fuel composition is illustrated in FIG. 2 using the example of a fuel with different ethanol fraction. Said figure illustrates the phase position of a signal frequency corresponding to the intake frequency as a function of the ethanol fraction of a gasoline-ethanol mixture. Here, a shift in the phase position of the intake frequency towards smaller values is observed with increasing ethanol fraction in the fuel. By interpolating between the individual measurement points MP0 to MP100, a continuous phase position curve 100 with an approximately linear profile is realized.

In principle, this relationship alone can already be utilized to determine the fuel composition from actual phase angles, determined during normal operation, of the selected signal frequency of the pressure oscillation signal, by means of a comparison with so-called reference phase positions of the same signal frequency determined in advance, for example on a reference internal combustion engine of identical design. These reference phase positions are uniquely assigned the corresponding fuel compositions. It is thus possible, by means of the reference phase position that correlates with the determined actual phase position, to infer the associated fuel composition.

Extensive measurements and tests have however shown that disturbance influences, which are difficult to capture, can additionally influence the phase position of the selected signal frequencies, whereby the accuracy of the determination of the fuel composition in the simple way mentioned above can be adversely affected. Deviations of the internal combustion engine from the reference internal combustion engine utilized to determine the reference phase positions, which deviations arise from structural tolerances, are a particular example here. Tolerance-induced deviations may arise for example owing to deviating control timing of the inlet and outlet valves and owing to deviations of the reciprocating piston positions in relation to the measured phase angle of the crankshaft and owing to deviations in the geometry of the air-conducting components in the intake tract. Since said deviations may differ on every internal combustion engine of the series of internal combustion engines of identical design, at least within a certain variance, correction thereof would necessitate highly cumbersome measurement of each individual series internal combustion engine.

In some embodiments, a much simpler and more expedient solution includes, by virtue of the fact that the influence of the fuel composition on the phase position of the single frequencies is, as it were, separated from the other influences, and is considered on its own. This is achieved in that, firstly, as already described above, the actual phase position of a selected signal frequency of the measured pressure oscillations in relation to the crankshaft phase angle signal is determined in the case of intake-synchronous injection. This actual phase position comprises all known and unknown influential variables.

Figure 3:
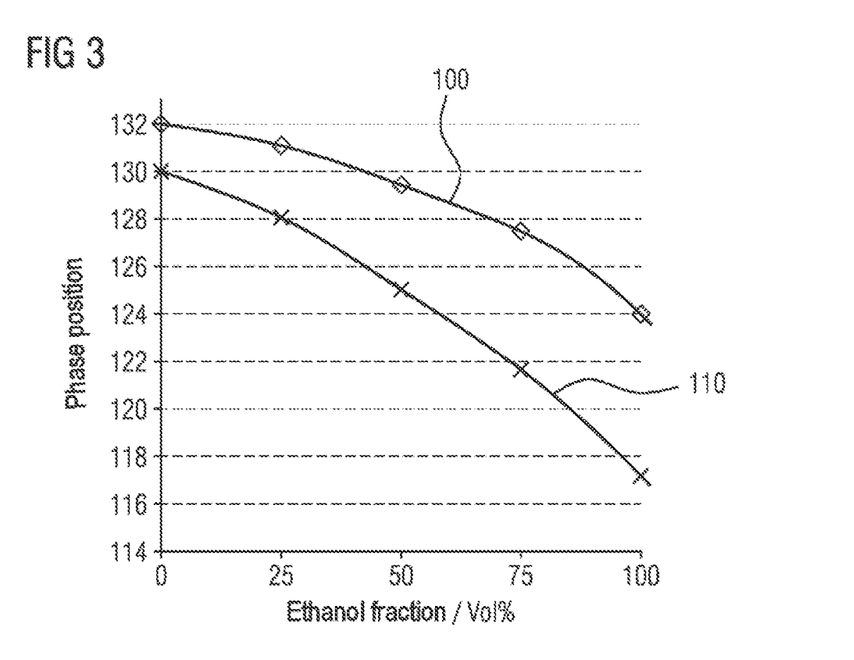
FIG. 3 shows a diagram for illustrating the phase position differences between determined actual phase positions and comparison phase positions as a function of the ethanol fraction in the fuel.

Subsequently, in addition to the determined actual phase position of the selected signal frequency in the case of intake-synchronous fuel injection, a further comparison phase position is then determined in the same way from the selected signal frequency in the absence of fuel injection or in the case of direct fuel injection into the closed combustion chamber. Owing to the absence of the fuel injection or the separation of the fuel injection from the intake tract owing to the closed inlet valves, the result is then a comparison phase position of the selected signal frequency, which comparison phase position is not influenced by injected fuel and comprises only all of the other influential variables. FIG. 3 illustrates firstly the phase position curve 100, which shows the actual phase positions determined during intake-synchronous injection, and secondly the phase position curve 110, which shows the comparison phase positions determined in the absence of fuel injection. From the illustration in FIG. 3, it is possible to observe an increasing influence of the fuel injection with increasing ethanol fraction.

By subtracting the value of the comparison phase position from the value of the actual phase position, one then obtains an actual phase position difference which reflects only the influence of the injected fuel. To now determine the fuel composition of the presently used fuel, the determined actual phase position difference is compared with reference phase position differences, determined in advance on a reference internal combustion engine, of the same signal frequency for different fuel compositions, and the associated fuel composition is inferred.

Figure 4:
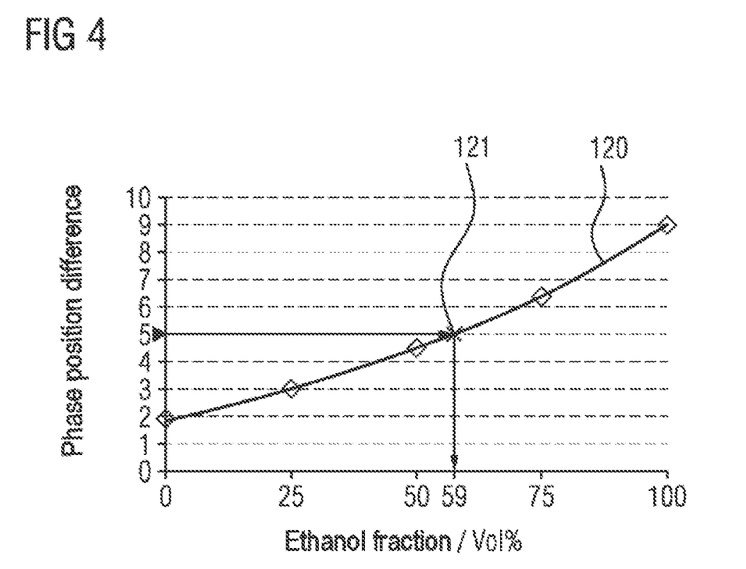
FIG. 4 shows a diagram for illustrating reference phase position differences.

FIG. 4 illustrates reference phase position differences, which correspond by means of the phase position difference curve 120, as a function of the ethanol fraction in the fuel. For straightforward implementation, the reference phase position differences determined in advance on a reference internal combustion engine from the series of internal combustion engines of identical design using reference fuel compositions may be stored as a function of the associated fuel compositions in reference characteristic maps, from which they can be accessed for comparison purposes. The simplest form of such a characteristic map is illustrated by way of example in FIG. 4 and consists in a diagram which, for a particular operating point of the internal combustion engine, replicates the dependency between the reference phase position difference of a particular selected signal frequency of the pressure oscillation signal, in this case the intake frequency, and the respectively associated fuel composition, in this case the ethanol fraction, in the form of a reference phase position difference curve 120. A corresponding, more comprehensive characteristic map may for example include corresponding reference phase position difference curves for different operating points of the internal combustion engine and different signal frequencies.

In some embodiments, the determination of the composition of the presently used fuel may in this example then be performed in a straightforward manner in that, proceeding from the determined actual phase position difference of the intake frequency during normal operation of the internal combustion engine, in FIG. 4 at phase position difference 5, the associated reference point 121 (in a horizontal direction) on the reference phase position difference curve 120 is determined, and proceeding from this in turn (in a vertical direction), the associated fuel composition, in this case ethanol fraction of 59 Vol %, is determined, as visually illustrated on the basis of the line denoted by arrows in FIG. 4.

In some embodiments, there is a model function which characterizes the corresponding reference phase position difference curve, and which replicates the relationship between reference phase position difference and the fuel composition, and thus calculating the current fuel composition with presetting of the determined actual phase position difference. The advantage of this alternative lies in the fact that, overall, less memory capacity has to be made available.

In some embodiments, it is assumed that the reference phase position differences for different fuel compositions are available for the implementation of the method. For this purpose, the reference phase position differences of the selected signal frequencies are determined prior to the normal operation on a reference internal combustion engine as a function of different fuel compositions. Here, the reference internal combustion engine is an internal combustion engine of identical design to the corresponding internal combustion engine series, and in which, in particular, it is ensured that as far as possible no behavior-influencing structural tolerance deviations are present. It is thereby sought to ensure that the relationship between fuel composition and phase position difference is determined as accurately as possible and without the influence of further disturbance factors.

The determination of corresponding reference phase position differences is possible by means of the reference internal combustion engine at different operating points and with presetting or variation of further operating parameters such as the temperature of the drawn-in medium, the coolant temperature or the engine speed. The reference value characteristic maps thus generated can then advantageously be made available in all series internal combustion engines of identical design, in particular stored in a memory area of an electronic processing unit assignable to the internal combustion engine.

In some embodiments, it is possible, from the determined reference phase position differences of the selected signal frequency and the associated fuel compositions, and for example using a polynomial approach, to derive a model function which replicates at least the relationship between the reference phase position differences of the selected signal frequency and the fuel compositions. Here, it is optionally also possible for additional parameters, such as for example the temperature of the drawn-in medium in the intake tract, the temperature of a coolant used for cooling the internal combustion engine and the engine speed of the internal combustion engine to also be incorporated, which parameters, as will be discussed in more detail below, can be additionally taken into consideration in order to increase the accuracy of the method.

In some embodiments, a model function is thus generated with which, with presetting of the phase position difference and possible incorporation of the abovementioned additional parameters, the respective current fuel composition can be calculated. The model function can then be made available in all series internal combustion engines of identical design, in particular stored in a memory area of an electronic processing unit assignable to the internal combustion engine. The advantages lie in the fact that the model function requires less memory space than comprehensive reference value characteristic maps.

Figure 5:
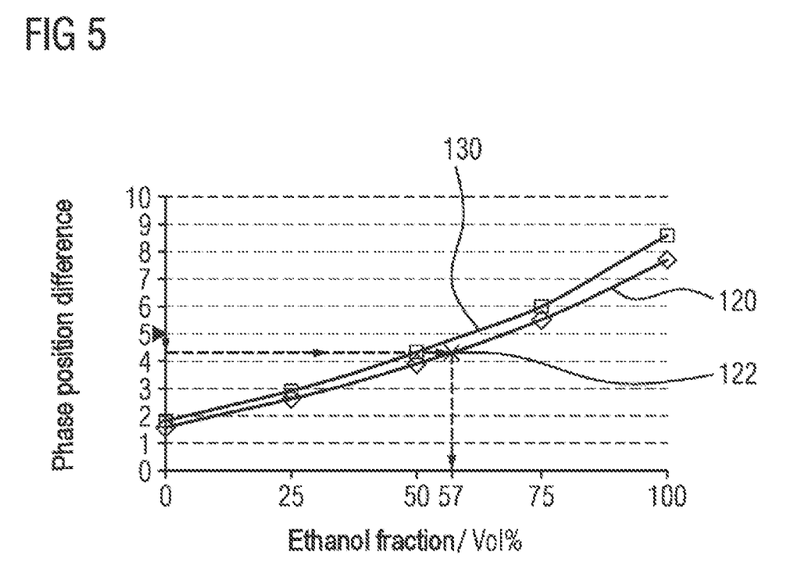
FIG. 5 shows a diagram for illustrating the phase position differences of a reference internal combustion engine in relation to the actual phase position differences of a series internal combustion engine of identical design.

Although it is sought, by taking into consideration the phase position differences as presented above, to eliminate influences resulting from tolerance-induced deviations of the respective series internal combustion engine from the reference internal combustion engine, engine-specific deviations of the phase position differences are evident in comparison measurements using reference fuels with known fuel composition. This is illustrated in FIG. 5 on the basis of the reference phase position difference curve 120 and on the basis of an engine-specific actual phase position difference curve 130. The deviation of the actual phase position differences shown here amounts in this case on average to +14% in relation to the reference phase position differences.

To additionally take such engine-specific deviations into consideration and thus further increase the accuracy of the method, it is possible for an additional corrective value, which is specific to the respective internal combustion engine, to be taken into consideration in the determination of the fuel composition. This may be realized for example by virtue of the determined actual phase position difference initially being corrected with the correction factor, and then the fuel composition of the presently used fuel being determined using the corrected actual phase position by means of reference phase position difference characteristic map or model function. In the example mentioned above, an average deviation of +14% yields a correction factor of 1/1.14, by which the determined actual phase position difference is initially multiplied, with the fuel composition only then being determined using the corrected actual phase position difference value. This approach is also qualitatively illustrated graphically in FIG. 5 by a dashed line. Proceeding from the actual phase position difference value 5 determined on the series internal combustion engine, a correction is firstly performed by means of the correction value 1/1.14 to a corrected phase position difference value of 4.4. Then, with this value, using the reference phase position difference curve 120, the corrected reference point 122 is determined (in a horizontal direction), and from this in turn, an ethanol fraction of 57 Vol % is determined (in a vertical direction).

In some embodiments, the abovementioned engine-specific corrective value is determined prior to the normal operation on the respective series internal combustion engine. This may be realized by determination of the actual phase position difference using a reference fuel with known fuel composition, and subsequent comparison with the reference phase position difference for the known fuel composition. The corrective value can then be derived from the determined difference. The engine-specific corrective value thus determined can then be stored in order to be accessed. The engine-specific corrective value can thus be performed for example for every series internal combustion engine, as it were as a final step of the production process at the end of the production line (end of line), in a test run of the internal combustion engine.

In some embodiments, to further increase the accuracy of the determination of the composition of the fuel used, it is possible for additional operating parameters of the internal combustion engine to be taken into consideration in the determination of the fuel composition. For this purpose, at least one of the further operating parameters
  temperature of the intake medium in the intake tract,
  temperature of a coolant used for cooling the internal combustion engine and
  engine speed of the internal combustion engine,
may be taken into consideration in the determination of the fuel composition of the fuel used.

The temperature of the drawn-in medium, that is to say substantially of the intake air, directly influences the speed of sound in the medium and thus the pressure propagation in the inlet tract. This temperature can be measured in the intake tract and is therefore known. The temperature of the coolant can also influence the speed of sound in the drawn-in medium owing to heat transfer in the inlet duct and in the cylinder. This temperature is generally also monitored and, for this purpose, measured, and is thus available in any case and can be taken into consideration in the determination of the fuel composition. The engine speed is one of the variables that characterizes the operating point of the internal combustion engine and influences the time available for the pressure propagation in the inlet duct. The engine speed is also constantly monitored and is thus available for the determination of the fuel composition.

The abovementioned additional parameters are thus available in any case or can be determined in a straightforward manner. The respective influence of the stated parameters on the phase position difference of the selected signal frequency of the pressure oscillation signals is in this case assumed to be known and has been determined for example during the measurement of a reference internal combustion engine and jointly stored in the reference value characteristic maps. The incorporation by means of corresponding correction factors or correction functions in the calculation of the fuel composition by means of a model function also constitutes a possibility for taking this additional, further operating parameter into consideration in the determination of the fuel composition.

In some embodiments, the determination of the actual phase position differences of the selected signal frequency and the determination of the composition of the presently used fuel is performed with the aid of an electronic processing unit assigned to the internal combustion engine, for example the central engine control unit (CPU) of the internal combustion engine, wherein the reference value characteristic maps or the model functions, and possibly the engine-specific corrective value, are stored in at least one memory area of the electronic processing unit. In this way, the method according to the invention can be implemented automatically, very quickly and repeatedly during the operation of the series internal combustion engine.

In some embodiments, the determination in advance of the reference phase position differences of the selected signal frequency may be performed by the measurement of a reference internal combustion engine at at least one defined operating point in a measurement mode, using reference fuels of different, known fuel compositions. Here, for the determination of the reference phase position differences of the selected signal frequency, the dynamic pressure oscillations, assignable to a cylinder of the reference internal combustion engine, in the inlet tract are measured in the measurement mode firstly during intake-synchronous fuel injection and secondly in the absence of fuel injection or in the case of direct fuel injection into the closed combustion chamber, and corresponding pressure oscillation signals are generated.

At the same time as the measurement of the dynamic pressure oscillations, a crankshaft phase angle signal may be determined. Subsequently, from the pressure oscillation signals, by means of discrete Fourier transformation, a reference phase position and a reference comparison phase position of a selected signal frequency of the measured pressure oscillations in relation to the crankshaft phase angle signal for the respective reference fuel are determined. Furthermore, a respective reference phase position difference between the reference phase position and the reference comparison phase position may be determined.

The determined reference phase position differences are then stored as a function of the associated fuel compositions in reference value characteristic maps. This permits the reliable determination of the dependency between fuel composition and phase position difference of the selected signal frequency. The abovementioned approach may be repeated with variation of particular influencing operating parameters, for example at different operating points, in order to broaden the database and incorporate the influences of the further parameters. This facilitates the implementation of the method during operation, because in implementing the method, one is then possibly not reliant on exactly adhering to particular parameters.

In some embodiments, the intake frequency or a multiple of the intake frequency to be chosen as selected signal frequencies. In the case of these signal frequencies, the dependency of the phase position difference on the fuel composition is particularly pronounced. In some embodiments, it is furthermore advantageously possible for the dynamic pressure oscillations in the intake tract to be measured by means of a series-production-type pressure sensor in the intake pipe. This has the advantage that no additional pressure sensor is required, which represents a cost advantage.

In some embodiments, the crankshaft position feedback signal may be determined by means of a toothed gear and a Hall sensor, wherein this is a customary sensor arrangement, which is possibly present in the internal combustion engine in any case, for detecting the crankshaft rotations. The toothed gear is in this case arranged for example on the outer circumference of a flywheel or of the crankshaft timing adapter 10 (see also FIG. 1). This has the advantage that no additional sensor arrangement is required, which represents a cost advantage.

In some embodiments, the electronic processing unit with the aid of which the method is implemented and on which the reference value characteristic maps or the model function are stored is an engine control unit (CPU) for controlling the internal combustion engine, and an adaptation of further control variables or control routines for the control of the internal combustion engine is performed by the engine control unit as a function of the determined fuel composition. This firstly has the advantage that no separate electronic processing unit is required, and there are thus also no additional interfaces, which are possibly susceptible to failure, between multiple processing units. Secondly, the method according to the invention can thus be made an integral constituent part of the control routines of the internal combustion engine, whereby a fast adaptation of the control variables or control routines for the internal combustion engine to the presently used fuel is possible.

Summarized briefly once again, the essence of a method for determining the composition of the fuel used for operating an internal combustion engine may include wherein the dynamic pressure oscillations in the inlet tract of the respective internal combustion engine are measured during normal operation, and from these, corresponding pressure oscillation signals are generated. At the same time, a crankshaft phase angle signal is determined. From the pressure oscillation signal, an actual phase position difference of a selected signal frequency of the measured pressure oscillations in relation to the crankshaft phase angle signal is determined, and the composition of the presently used fuel is determined on the basis of the determined actual phase position difference taking into consideration reference phase position differences of the same signal frequency for different fuel compositions.

What is claimed is:

1. A method for operating an internal combustion engine, the method comprising:
during normal operation of the internal combustion engine, measuring dynamic pressure oscillations in an inlet tract of a cylinder of the internal combustion engine at a defined operating point during intake-synchronous fuel injection;
generating a pressure oscillation signal based at least in part on the measured dynamic pressure oscillations;
determining a crankshaft phase angle signal corresponding to the pressure oscillation signal; and
calculating, using discrete Fourier transformation an actual phase position of at least one selected signal frequency of the measured dynamic pressure oscillations in relation to the crankshaft phase angle signal;
calculating, using discrete Fourier transformation, a comparison phase position of the at least one selected signal frequency of the measured dynamic pressure oscillations in the inlet tract of the cylinder during (a) an absence of fuel injection into the combustion chamber (b) direct fuel injection into the combustion chamber during a closed state of the combustion chamber;
calculating a phase position difference between the actual phase position and the comparison phase position;
determining a fuel composition based on (a) the determined actual phase position difference and (b) reference phase position data indicating reference phase position differences of the at least one selected signal frequency for different reference fuel compositions and
adapting operating parameters of the internal combustion engine based on the determined fuel composition.

2. The method as claimed in claim 1, further comprising storing the reference data indicating reference phase position differences in reference value characteristic maps.

3. The method as claimed in claim 1, wherein the reference phase position differences of the at least one selected signal frequency have been determined prior to the normal operation, using a reference internal combustion engine, as a function of different fuel compositions.

4. The method as claimed in claim 3, wherein the prior determination of the reference phase position differences of the at least one selected signal frequency includes measurement of at least one defined operating point of a reference internal combustion engine, in a measurement mode using reference fuels of different, known fuel compositions, wherein the determination of the reference phase position differences includes:

measuring dynamic pressure oscillations in an inlet tract of the reference internal combustion engine (a) during intake-synchronous fuel injection and (b) in the absence of fuel injection into an combustion chamber of the reference internal combustion engine (b) direct fuel injection into the combustion chamber during a closed state of the combustion chamber of the reference internal combustion engine;

generating corresponding reference pressure oscillation signals;

determining a reference crankshaft phase angle signal;

calculating, using discrete Fourier transformation, a a reference phase position and a reference comparison phase position of at least one selected signal frequency of the measured dynamic pressure oscillations in relation to the reference crankshaft phase angle signal for the reference fuels; and determining and storing data indicating a reference phase position difference between the reference phase position and the reference comparison phase position is determined as a function of the associated fuel compositions of the reference fuels.

5. The method as claimed in claim 1, comprising determining the fuel composition based on (a) the determined actual phase position difference, (b) the reference phase position data, and (c) a corrective value specific to the respective internal combustion engine.

6. The method as claimed in claim 5, wherein the corrective value specific to the internal combustion engine is determined and stored prior to the normal operation of the internal combustion engine by determining a phase position difference using a reference fuel with a known fuel composition.

7. The method as claimed in claim 5, wherein the corrective value is stored in memory.

8. The method as claimed in claim 1, comprising determining the fuel composition based on (a) the determined actual phase position difference, (b) the reference phase position data, and (c) at least one of further operating parameters selected from the group consisting of: a temperature in the intake tract, a temperature of a coolant in the internal combustion engine, and an engine speed of the internal combustion engine.

9. The method as claimed in claim 1, wherein the steps of determining the actual phase position difference of the at least one selected signal frequency and determining the fuel composition are performed by an electronic processing unit of the internal combustion engine; and the reference phase position data is stored in a memory of the electronic processing unit.

10. The method as claimed in claim 9, wherein the electronic processing unit comprises an engine control unit for the internal combustion engine.

11. The method as claimed in claim 1, wherein the at least one selected signal frequency comprises an intake frequency or a multiple of the intake frequency.

12. The method as claimed in claim 1, wherein the dynamic pressure oscillations are measured with a series-production-type pressure sensor in the intake pipe.

13. The method as claimed in claim 1, wherein the crankshaft phase angle signal is determined with a toothed gear and a Hall sensor.

14. The method as claimed in claim 1, wherein the reference phase position differences are determined based on a stored model function.

15. The method as claimed in claim 14, wherein the model function is derived prior to the normal operation of the internal combustion engine and represents a relationship between the reference phase position differences of the at least one selected signal frequency and the different reference fuel compositions.

* * * * *